United States Patent
Ravichandran et al.

(10) Patent No.: US 10,951,581 B2
(45) Date of Patent: Mar. 16, 2021

(54) MITIGATION OF ATTACKS ON SATELLITE NETWORKS

(71) Applicant: Hughes Network Systems, LLC, Germantown, MD (US)

(72) Inventors: Akshay Giridhar Ravichandran, Gaithersburg, MD (US); Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 228 days.

(21) Appl. No.: 16/104,725

(22) Filed: Aug. 17, 2018

(65) Prior Publication Data

US 2020/0059452 A1  Feb. 20, 2020

(51) Int. Cl.
| H04L 29/06 | (2006.01) |
| H04B 7/185 | (2006.01) |
| H04L 12/66 | (2006.01) |

(52) U.S. Cl.
CPC ......... *H04L 63/0209* (2013.01); *H04B 7/185* (2013.01); *H04L 12/66* (2013.01); *H04L 63/0245* (2013.01); *H04L 63/145* (2013.01); *H04L 63/1458* (2013.01); *H04L 2463/142* (2013.01); *H04L 2463/144* (2013.01)

(58) Field of Classification Search
CPC . H04L 63/0209; H04L 12/66; H04L 63/0245; H04L 63/145; H04L 63/1458; H04L 2463/142; H04L 2463/144; H04L 63/1425; H04L 63/1416; H04B 7/185; H04B 7/18593; H04W 12/1204

See application file for complete search history.

(56) References Cited

U.S. PATENT DOCUMENTS

| 2013/0074144 | A1* | 3/2013 | Narayanaswamy ........................ H04L 63/1408 726/1 |
| 2014/0033310 | A1 | 1/2014 | Cheng |
| 2017/0126411 | A1* | 5/2017 | Piqueras Jover ..... H04W 12/04 |
| 2019/0036951 | A1* | 1/2019 | Kim ...................... H04W 12/06 |
| 2019/0098555 | A1* | 3/2019 | Winterton ......... H04W 12/1008 |

FOREIGN PATENT DOCUMENTS

WO    2005111805 A1    11/2005

OTHER PUBLICATIONS

International Search Report and Written Opinion for PCT/US2019/046645 dated Oct. 1, 2019 (11 pages).

* cited by examiner

*Primary Examiner* — Mahfuzur Rahman
(74) *Attorney, Agent, or Firm* — Bejin Bieneman PLC

(57) ABSTRACT

A system includes a terminal and a gateway. The terminal is programmed to identify, in received data, a signature of rogue data that includes at least a device identifier and an application identifier, and to transmit, via uplink to a satellite, the identified signature to a gateway. The gateway is programmed to block downlink data, upon determining that downlink data includes the received signature, and to broadcast the received signature to a second gateway.

17 Claims, 5 Drawing Sheets

MITIGATION OF ATTACKS ON SATELLITE NETWORKS

BACKGROUND

A satellite network allows traffic between devices, terminals, satellite(s), and gateways. For example, a device such as a mobile device or computer, connected through a local area network to a terminal, can communicate with another device, i.e., via a satellite uplink and/or downlink and one or more gateways. A rogue device, e.g., a mobile device having a rogue application, may attack the satellite network by propagating rogue data via the terminal through the network. A distributed Denial of Service (DDOS) attack can flood a network with incoming packets or messages, resulting in denial of network services, e.g., satellite bandwidth, connections, CPU and other resources, for legitimate users.

DETAILED DESCRIPTION

Introduction

Figure 1:
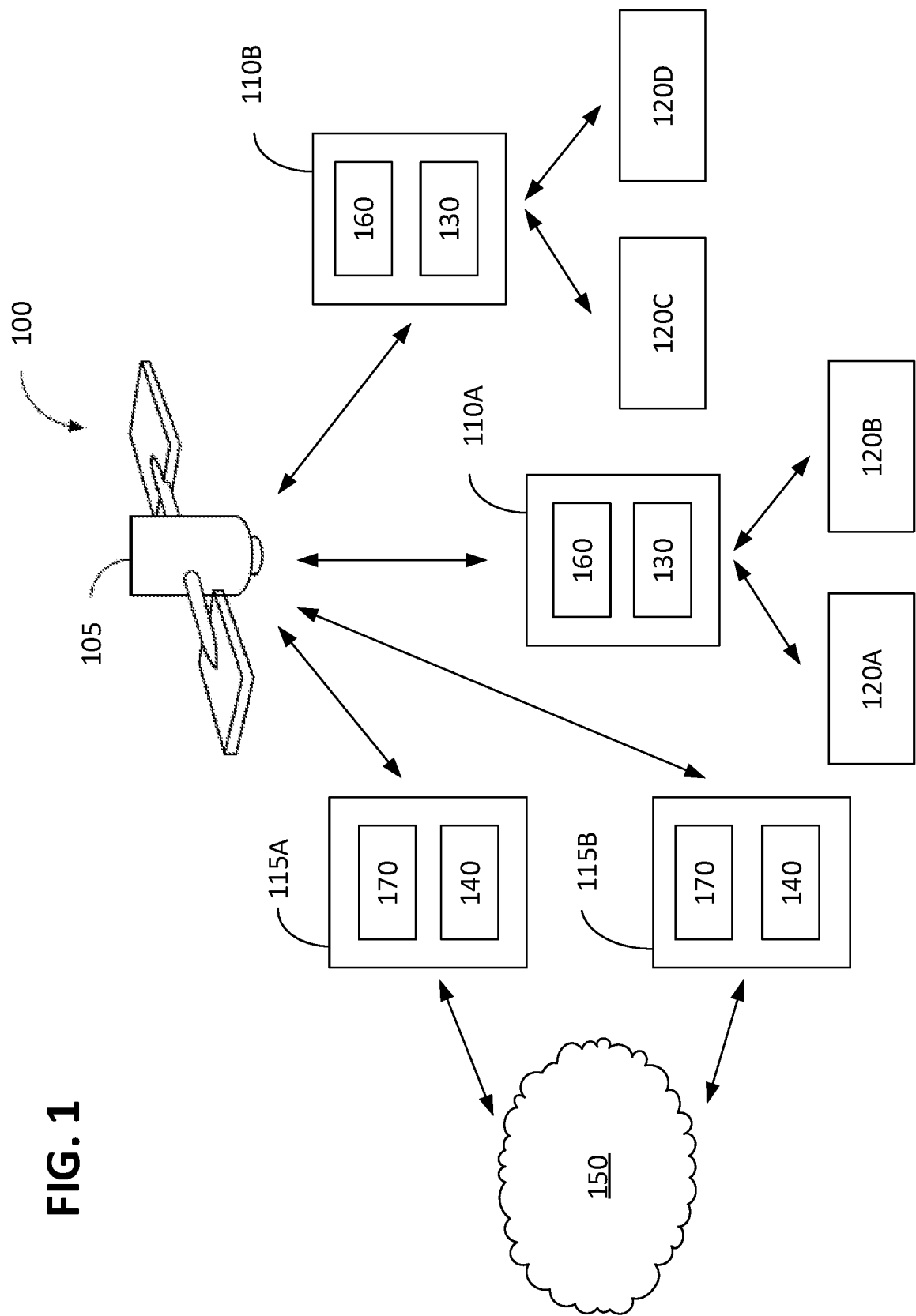
FIG. 1 illustrates an example satellite telecommunications network.

Disclosed herein is a system including a terminal programmed to identify, in received data, a signature of rogue data that includes at least a device identifier and an application identifier, and to transmit, via uplink to a satellite, the identified signature to a gateway, and the gateway programmed to block downlink data, upon determining that downlink data includes the received signature, and broadcast the received signature to a second gateway.

The system may further include a second terminal programmed to receive the signature from the second gateway, to receive data from the device, and to block uplink data associated with the received data upon determining that the received data from the device includes the received signature.

The second terminal may be further programmed to store the received signature locally.

The terminal may be further programmed to sniff at least one of uplink and downlink data, and to identify the signature of the rogue data based on clustering the sniffed data.

The gateway may be further programmed to sniff at least one of uplink and downlink data, to identify the signature of the rogue device, to broadcast the identified signature, and to block at least one of the downlink and uplink of the rogue data.

The signature may further include a data pattern, a type of attack, a frequency of attack, and a status.

The type of attack may be at least one of SYN Flood, UDP Flood, SMBLoris, ICMP Flood, and HTTP Get Flood.

The terminal may be further programmed to change a status of the signature to expired upon determining that the received data lacks rogue data associated with the signature.

The terminal may be further programmed to update a previously stored signature and broadcast the updated signature.

Further disclosed herein is a method including identifying, in received data at a terminal, a signature of rogue data that includes at least a device identifier and an application identifier, and transmitting, via uplink to a satellite, the identified signature to a gateway, blocking downlink data, at the gateway, upon determining that downlink data includes the received signature, and broadcasting the received signature to a second gateway.

The method may further include receiving, at a second terminal, the signature from the second gateway, receiving, at the second terminal, data from the device, blocking uplink data associated with the received data, at the second terminal, upon determining that the received data from the device includes the received signature.

The method may further include storing the received signature locally at the second terminal.

The method may further include sniffing, at the terminal, at least one of uplink and downlink data, and identifying the signature of the rogue data based on clustering the sniffed data.

The method may further include sniffing, at the gateway, at least one of uplink and downlink data, identifying, at the gateway, the signature of the rogue device, broadcasting, at the gateway, the identified signature, and blocking, at the gateway, at least one of the downlink and uplink of the rogue data.

The signature may further include a data pattern, a type of attack, a frequency of attack, and a status.

The type of attack may be at least one of SYN Flood, UDP Flood, SMBLoris, ICMP Flood, and HTTP Get Flood.

The method may further include updating, at the terminal, a previously stored signature and broadcasting the updated signature.

Further disclosed herein is a system including means for identifying, in received data at a terminal, a signature of rogue data that includes at least a device identifier and an application identifier, and means for transmitting, via uplink to a satellite, the identified signature to a gateway, means for blocking downlink data, at the gateway, upon determining that downlink data includes the received signature, and means for broadcasting the received signature to a second gateway.

The system may further include means for receiving, at a second terminal, the signature from the second gateway, means for receiving, at the second terminal, data from the device, and means for blocking uplink data associated with the received data, at the second terminal, upon determining that the received data from the device includes the received signature.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

A satellite network may include a first and a second terminal, and a first and a second gateway that communicate via a satellite uplink and/or downlink. The first terminal is programmed to identify, in received data, e.g., from a mobile device, a signature of rogue data that includes at least an identity of the device and an identity of an application. The first terminal is further programmed to transmit to a gateway, via an uplink to a satellite, the identified signature. The gateway is programmed to block downlink data upon determining that downlink data includes the received signature. The gateway can be further programmed to broadcast the received signature to the second gateway. The second terminal is programmed to receive the signature from the second gateway, to receive data from the device, and to block uplink data associated with the received data upon determining that the data received from the device includes the received signature.

Advantageously, disclosed herein is detecting an attack such as a DDOS attack based on learning traffic patterns, and then proactively can prevent propagation of the attack by providing distributed coordination among components, e.g., devices, gateways, etc., involved in the attack. Each terminal in a satellite network may act as a sniffer by logging traffic behavior(s) from all sources into a local memory. Periodically, data from terminal logs are input to a clustering algorithm to group the traffic patterns and to determine the rogue anomalies dynamically. Further, to provide a defense against a DDOS attack, future packets in the return direction (i.e., downloaded via downlink from the satellite to the rogue device, e.g., responses that are being sent to the rogue device based on requests sent by the rogue device) can be dropped or rate-limited. The identified patterns of the rogue sources can be broadcasted to gateways to block traffic from rogue devices in a forward direction (i.e., transmitted via uplink from a device to a satellite). Additionally, a detected pattern can be broadcast to other terminals to proactively monitor for similar patterns from rogue sources in a return direction. Thus, advantageously, the satellite network may stop or prevent propagation of rogue data through the satellite network.

As illustrated in FIG. 1, a satellite network 100 (sometimes referred to as a "communication network 100" herein) includes any number of computing devices, such as satellites 105, terminals 110A, 110B, and gateways 115A, 115B, each having a processor and memory. A computer memory can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processors may be programmed to execute instructions stored in the memory to carry out the actions of the satellites 105, terminals 110A, 110B, and gateways 115A, 115B, as discussed herein.

The satellites 105 collectively form a constellation (i.e., a group) of network nodes whose position changes relative to one another, to the ground, or both. The satellites 105 include various circuits, chips, or other electronic components. Satellites 105 may be in low Earth orbit (LEO) in multiple planes and orbits relative to one another. Examples of orbits may include a polar orbit, a geosynchronous orbit, or an inclined orbit. Because the satellites 105 are moving relative to the ground, the downlink and uplink beams served by each respective satellite 105 changes over time. Moreover, because the satellites 105 can move relative to one another, neighboring satellites 105 may also change over time. Thus, the other satellites 105 available for direct communication may change as one or more of the satellites 105 moves.

The terminals 110A, 110B, e.g., very small aperture terminals (VSAT), are computer-based communication devices implemented via circuits, chips, antennas, or other electronic components that can communicate with satellites 105 that are within communication range of the terminal 110A, 110B. In some instances, the terminals 110A, 110B are stationary relative to a location on Earth. In other instances, the terminals 110A, 110B are mobile, meaning that the terminals 110A, 110B move relative to a location on the Earth. In some instances, the terminal 110A, 110B may provide an interface between a satellite 105 and other ground-based communication devices. For instance, the terminal 110 may receive communications from a satellite 105 and transmit such communications via terrestrial-based communication channels. Likewise, the terminals 110A, 110B may receive communications via a terrestrial-based communication channel and transmit the communication to a satellite 105. The terminal 110A, 110B may include a modulator and a demodulator to facilitate communications with satellites 105, especially in the context of satellite 105 communication. Moreover, each terminal 110A, 110B may have one or more antennas. Multiple antennas may allow a terminal 110A, 110B to communicate with multiple satellites 105 at a time.

The gateways 115A, 115B are computer-based communication devices implemented via circuits, chips, antennas, or other electronic components that can communicate with one or more satellites 105 within the communication range of the gateway 115A, 115B. Each gateway 115A, 115B may be programmed to use different uplink and downlink methods to transmit data to and receive data from satellites 105. In one example, a gateway 115A, 115B may connect a network 150 to a satellite 105. In another example, a gateway 115A, 115B may be connected via other gateways 115A, 115B to a satellite 105. The gateways 115A, 115B may be either data gateways or system gateways.

Data gateways 115A, 115B may be used to facilitate multiple communication protocols along a network path. For instance, a data gateway may be used to facilitate a transition from a satellite 105 communication network to, e.g., a fiber optic network.

Each system gateway 115A, 115B may be programmed to transmit control and configuration data to satellites 105 as well as receive data, such as telemetry data, from satellites 105. The system gateways 115A, 115B may be configured to form a routing network for receiving packets on the downlink before uplinking the packets to a different node, including a different satellite 105. Since system gateways 115A, 115B can communicate with one or more satellites 105, the system gateway 115A, 115B may be able to receive packets via the downlink from one satellite 105 and uplink the packets to a different satellite 105 without having to store and forward the packets. And because system gateways 115A, 115B are programmed to transmit control and configuration data to satellites 105, the system gateway 115A, 115B may be programmed to upload routing tables to any number of satellites 105 within the communication range of the system gateway 115A, 115B. The system gateway 115A, 115B may further include instructions for propagating the routing table to other satellites 105.

For example, different telecommunications services, such as cellular technologies 2G, 3G, and 4G/LTE (Long-Term Evolution), may be provided through a same remote terminal 110 and a same gateway 115. Thus, rates for some traffic, such as traffic for 2G and 3G service, which is smaller in volume and throughput than traffic for 4G/LTE service, can be configured as separate (Virtual Local Area Network) VLANs, and the satellite network 100 can ensure that the configured rates are met when there is sufficient demand for such traffic. In other words, by separating the different types of traffic onto different VLANs, some traffic, such as 4G/LTE traffic, will not starve other traffic, such as 2G and 3G traffic. When there is not sufficient demand for the 2G and 3G traffic, all remaining bandwidth can go toward servicing the 4G/LTE traffic in a best effort model to reach the peak information rate (PIR) or maximum information rate.

A terminal 110A, 110B may communicate with devices 120A, 120B, 120C, 120D, e.g., via a local area network (LAN). For example, a terminal 110A may be located at a public location, e.g., a retail establishment, and may communicate via a wireless communication network to multiple user devices 120A, 120B, e.g., smart phones, tablets, etc., within a coverage range, e.g., 200 meters, of the local area network of the terminal 110A. Similarly, multiple user devices 120C, 120D within a coverage range of a local area network of the terminal 110B may communicate to the satellite network 100 via the terminal 110B. In a wireless network, the coverage range is a geographical area that is accessible by the local network wireless signal, e.g., a WiFi network of a store. In a wired network, a coverage range includes each node that is wired to a terminal 110A, 110B.

In one example, the device 120A may leave a coverage range of the local area network of the terminal 110A, and enter a coverage range of the local area network of the terminal 110B and communicate to the network 100 via the terminal 110B. In another example, the device 120A may be within a coverage range of either of the terminals 110A, 110B local area networks, e.g., two adjacent retail establishments each having distinct wireless local area networks that geographically overlap. In such an example, the device 120A may be connected to the satellite network 100 via the terminal 110A and/or terminal 110B.

A device that can communicate with the satellite network 100, such as the device 120A, may be a "rogue" device. A rogue device may be any of devices 120A, 120B, 120C, 120D that is placed, e.g., by an intruder, in a coverage range of a local area network of the terminal 110A 110B for malicious activities, e.g., unauthorized gathering of information, impairing an operation of the network 100, etc. Additionally or alternatively, the rogue device may be an authorized device that is affected (or infected) by a malicious software (or rogue application), e.g., a malware application, a virus, etc.

A rogue device may present a significant risk to the network 100. For example, a remote computer may store a rogue application on a device that is within the network 100 and thus, the device with the rogue application is a rogue device. A rogue application is software program including instructions to perform malicious activities via hardware of the device 120A. Additionally or alternatively, the rogue device 120A may be a device that includes a rogue hardware component that performs malicious activities. For example, a rogue hardware component could include an unauthorized chip that can decrypt an encrypted communication in the network 100. Thus, a rogue device 120A may include rogue hardware and/or rogue application(s), and may transmit and/or receive rogue data.

A rogue device 120A may send rogue data via a terminal 110A through a satellite 105 uplink and one or more gateways 115A, 115B to a computer network 150, e.g., including the Internet and/or other wide area network(s). In the present context, a direction of rogue data from a device 120A to gateways 115A, 115B is referred to as a "forward" direction. For example, a rogue device 120A may send data in a forward direction to a botnet network 150. Further, in the present context, a direction of rogue data toward a device 120A, e.g., from a gateway 115A, 115B via a satellite 105 downlink, is referred to as a "return" direction. A botnet network 150 means a network, e.g., a sub-network of Internet, that includes multiple Internet-connected devices, each of which is running one or more bots. Botnets can be used to perform a DDoS attack, steal data, send spam, and/or allow an attacker to access a device 120 and its connection. An internet bot, also known as a web robot, is a software application that runs automated tasks (scripts) over the Internet. Typically, bots perform tasks that are simple and structurally repetitive at a much higher rate than would be possible for a human alone, e.g., to automate script fetches, analyze and receive file and data from web servers at many times of a human speed, etc.

Rogue data may be propagated via a terminal 110A, 110B and/or a gateway 115A, 115B via a forward direction to the satellite network 100 and/or via a return direction. A satellite network 100 may include a first and a second terminal 110A, 110B, and a first and a second gateway 115A, 115B that communicate via a satellite 105 uplink and/or downlink. The first terminal 110A computer 160 can be programmed to identify, in data received, e.g., from a mobile device 120A, a signature of rogue data that includes at least an identity of the device 120A and an identity of an application, and transmit, via uplink to the satellite 105, the identified signature to the gateway 115A. The gateway 115A can be programmed to block downlink data upon determining that downlink data includes the received signature, and to broadcast the received signature to the second gateway 115B. As used herein, "broadcast" means distributing data to one or more unspecified devices, typically dispersed about the network 100, e.g., an unspecified number of terminals 110A, 110B and/or gateways 115A, 115B. In broadcasting, each receiver of the broadcasted data may further transmit the received data to other terminals 110A, 110B and/or gateways 115A, 115B.

The second terminal 110B computer 160 can be programmed, upon determining that the received data from the device 120A includes the received signature, to receive the signature from the second gateway 115B, to receive data from the device 120A, and to block uplink data associated with the received data. Thus, advantageously, the satellite network 100 may prevent propagation of rogue data in the satellite network 100.

To identify a signature of rogue data, a computer 160 of a terminal 110A, 110B may be programmed to sniff data that is communicated though the terminal 110A, 110B in the forward and/or return direction. In the preset context, "sniffing" means gaining access to data content, e.g., reading a payload of data packets transferred via the terminal 110A, 110B. Additionally or alternatively, "sniffing" may include copying the data to a second location for further processing. Then, the terminal 110A, 110B computer 160 may be programmed to cluster the sniffed data. The computer(s) 160 may be programmed to cluster the data using clustering algorithms such as K-means. Data clustering may include identifying data patterns and grouping the data patterns. The computer 160 may be programmed to determine a signature of rogue data based on clustered patterns, sender data, etc., as discussed below.

TABLE 1

| Data item | Description |
| --- | --- |
| Data Pattern | Ethernet parameters: Source MAC (Media Access Control) address, Destination MAC, Type<br>IP parameters: Version, DSCP (Differentiated Services Code Point), Protocol, Source Address, Destination Address, Length of data, TTL (Time to Live), IP identifier<br>UDP (User Datagram Protocol) parameters: Source port, Destination port<br>ICMP (Internet Control Message Protocol) parameters: Type<br>TCP (Transmission Control Protocol) parameters: Source port, Destination port, Flag, Sequence number, Acknowledge Number, Window Size |
| Device identifier | An identifier of a device |
| Application identifier | An identifier in application software, e.g., an APP ID |
| Type of attack | SYN Flood, UDP Flood, SMB Loris, ICMP Flood, HTTP GET Flood, etc. |
| Frequency of attack | A rate of attack typically specified in a percentage value, e.g., 90%. |
| Status | Currently active, expired, etc. |
| Routing path | Identified routing path of the attack |

In the present context, as illustrated in Table 1, an identified signature may include a pattern of clustered rogue data, an identifier of a device 120A that transmits and/or receives the identified rogue data, an identifier of an application software that transmits and/or receives the identified rogue data. Further, the computer(s) 160 may store data including a list of possible attacks as shown in Table 2 below. The computer(s) 160 may be programmed to detect a type of attack based on sniffed data using conventional techniques. The computer(s) 160 may be further programmed to determine a signature of rogue data upon determining that a type of detected is included in the stored types of attacks. The computer 160 may be programmed to determine a frequency of attack, a status of the attack, and a routing path. In the present context, a routing path may include data such as IP addresses of computers though which rogue data passes, e.g., a list of IP addresses that are included in a path of the rogue data through the network 100.

As discussed above, the computer 160, 170 may be programmed to transmit the signature data to other computers 160, 170. In one example, upon determining that the computer 160 is directly connected to the rogue device 120A (e.g., via Ethernet), the computer 160 may be programmed to transmit Ethernet parameters, UDP parameters, TCP parameters, ICMP parameters (see Table 1) to the computer(s) 170. In another example, upon determining the computer 160 is indirectly (e.g., via other gateways 115A, 115B, etc.) connected to the rogue device 120A, the computer 160 may be programmed to transmit the IP parameters, UDP parameters, TCP parameters, ICMP parameters, and/or the routing path to the computer 170.

TABLE 2

| | |
| --- | --- |
| SYN Flood | Multiple TCP SYN requests are sent to a target computer with an intention of consuming enough resources to make the target computer unavailable. |
| UDP Flood | Botnets are typically utilized to send a significant amount of traffic to a target computer, which may result in an accelerated attack process that seeks to consume all of the bandwidth available by the computer as opposed to its resources. UDP packets are received by the target computer, which then checks for applications listening on a specific port and then sends an ICMP reply in return. |
| SMBLoris | An application-level attack that takes place when a malicious actor opens up multiple SMB connections to a target computer, which results in consumption of available memory and denial of service. |
| ICMP Flood | Botnets are utilized to send a large number of ICMP packets to a target while attempting to consume all available bandwidth. Different variables can be utilized when sending requests such as 'ping' that increase bandwidth and frequency, resulting in denial of service. |
| HTTP GET Flood | A significant number of HTTP GET requests are generated by a malicious actor toward a target computer that allows for the consumption of all available resources. While the target computer attempts to respond to each request, the malicious actor will send them continuously until achieving a desired result, e.g., a denial of service. |

The terminal 110A, 110B computer 160 may be programmed to periodically, e.g., every 100 ms (milliseconds), check for an occurrence and/or recurrence of a flooding attack from a source, e.g., a device 120A, and to determine a ratio of a rogue packet count to a total packet count. The computer 160, 170 may be programmed to identify an attack based at least in part on source port and/or destination port during UDP-based communication. Additionally or alternatively, the computer 160, 170 may be programmed to identify an attack based at least in part on a type of data during an ICMP-based communication. Additionally or alternatively, the computer 160, 170 may be programmed to identify an attack based at least in part on source port, destination port, flag, sequence number, acknowledge Number, and/or window Size during a TCP-based communication. Additionally or alternatively, the computer 160 may be programmed to identify an attacker based on routing path. The computer(s) 160 may be programmed to categorize a type of an attack and a frequency of the attack. For example, if the rogue device 120A produces only TCP SYN and no other traffic, the frequency of attack is 100% TCP SYN flooding. In another example, if the rogue device 120A produces UDP traffic that exhaust (or uses) an entire bandwidth always and does not allow any normal (or authorized traffic to pass), the frequency of attack is 100% UDP flooding. As used herein, a frequency of attack is a numeric quantifier that may be specified in a percentage, which quantifies a bandwidth taken by rogue data transfer compared to available bandwidth. For example, a frequency of attack of 10% means 10% of packets or data being transferred over or at a given time are rogue data, i.e., 10% of the bandwidth is taken by the rogue data.

Additionally or alternatively, the computer(s) 160 may be programmed to identify a signature of rogue data by scanning opened UDP and/or TCP ports at the respective terminal 110A. If the traffic is for a valid listening port, that is authorized. If the traffic is for an invalid non-listening port, then the computer(s) 160 may flag the traffic to look for flooding attacks.

If a UDP flooding attack saturates a terminal 110A, 110B download rate, then the computer 160 may identify the source, e.g., the device 120A, as a rogue device. For TCP SYN flooding attacks, if the traffic is spoofed, it can be detected locally at a gateway 115A, 115B. If it is not spoofed, a terminal 110A, 110B computer 160 may be programmed to determine whether rogue data generated by a rogue source are SYN data packets. In the present context, a "spoofing attack" is an attack in which a computer and/or a program masquerades as another by falsifying data, e.g., submitting an identifier of the other device. The computer 160 may detect ICMP flooding attacks based on data packet size.

TABLE 3

| Signature identifier | Signature data |
| --- | --- |
| Signature 1 | Data pattern<br>Device identifier(s)<br>Application identifier(s)<br>Type of attack<br>Frequency of attack<br>Status |
| ... | ... |
| Signature N | Data pattern<br>Device identifier(s)<br>Application identifier(s)<br>Type of attack<br>Frequency of attack<br>Status |

The computer(s) 160 may be programmed to store the signature data in a terminal 110A, 110B memory 130. As illustrated by Table 3, the computer 160 may be programmed to store the signature data. For example, the signature data can be stored in a standardized format such as extensible markup language (XML). Table 3 shows, for example, N detected and stored signatures.

An attack may stop because of various reasons, e.g., a failure of the rogue device 120A. The computer(s) 160 may be programmed to, e.g., periodically every 100 milliseconds (ms), update the list of stored signatures. For example, a computer 160 may be programmed to eliminate a signature N from the stored list of signatures in the memory 130, upon determining that the attack does not continue. For example, the computer 160 may be programmed to determine that an attack does not continue, upon determining that the respective attack was not repeated for at least a specified time, e.g., 1 minute.

A computer such as a terminal 110A, 110B computer 160 and/or a gateway 115A, 115B computer 170 may be programmed to broadcast the stored signature data in the network 100. The computers 160, 170 may be programmed to broadcast a list of the signatures, e.g., as shown in Table 3. The computers 160, 170 may broadcast received signature data further to other terminals 110A, 110B, gateways 115A, 115B, etc. Thus, other terminals 110A, 110B, gateways 115A, 115B can be programmed to detect rogue data based on the broadcasted signature data.

The computers 160, 170 may be programmed to update the stored signatures based on a received list of signatures broadcasted by other terminals 110A, 110B, gateways 115A, 115B in the network 100. The computers 160, 170 may be programmed to compare the received signature data to signature data stored locally in the memory 130, 140, and to update locally stored signature data based on the comparison results. In the present context, "locally stored" with respect to a computer 160, 170 means stored in a memory 130, 140 of a same computer 160, 170, e.g., of a same terminal 110A, 110B, gateway 115A, 115B, etc. In one example, upon determining a change, e.g., frequency of attack, in the received signature data, computers 160, 170 may be programmed to update the locally stored signature data by overwriting the locally stored data, e.g., updating a frequency of attack, status, etc., of a locally stored signature as shown in Table 1. For example, the computer 160, 170 may update the frequency of attack of an already stored signature. In another example, upon determining that a status of received signature data is "expired," the computers 160, 170 may be programmed to eliminate the expired signature from the locally stored signature data. In one example, a signature expires after a predetermined time in which no attack has occurred. The computers 160, 170 may be programmed to change a status of a signature to "expired" upon determining that the attack specified by the signature has not occurred for at least a predetermined amount of time, e.g., 1 minute. Additionally, the computer 160, 170 may be programmed to eliminate a locally stored signature with a status "expired." Additionally, the computer 160, 170 may be programmed to inform other computers 160, 170 indicating that a signature is expired, e.g., by sending a message including updated signature having status changed to "expired." Thus, other computers 160, 170 may be programmed to eliminate a locally stored signature upon receiving a message indicating that the respective signature is expired.

Computer(s) 160, 170 of the terminals 110A, 110B, gateways 115A, 115B may be programmed to sniff data communicating through the respective terminal 110A, 110B, gateway 115A, 115B, and to determine whether the sniffed data matches the stored signature data, i.e., whether rogue data is detected in the data being communicated via the respective terminal 110A, 110B, gateway 115A, 115B. In the present context, "sniffed data matching the stored signature" means attributes of the sniffed data match at least one of the stored signatures, i.e., having one or more of (i) device identifier, application identifier, and one or more of (ii) a same data pattern, type of attack, frequency of attack, etc. For example, the terminal 110A, 110B and/or the gateway 115A, 115B may be programmed to determine that the sniffed data matches a signature upon determining that the data is originated from a same device (e.g., based on matching a device identifier of the signature and the device identifier included in the sniffed data) and the sniffed data has same pattern as the pattern specified in the respective signature.

The gateway 115A, 115B computer 170 and/or the terminal 110A, 110B computer 160 may be programmed to block rogue data upon determining that the data being communicated through the gateway 115A, 115B and/or the terminal 110A, 110B has a signature matching a stored signature. The computer 160, 170 may be programmed to block the data by (i) dropping data packets of rogue data completely, (ii) throttling a rate of data transfer based on frequency of attack, or (iii) adaptively throttling the bandwidth of the communication of the respective computer 160, 170 with the computer that sends and/or receives the rogue data.

A gateway 115A, 115B computer 170 and/or a terminal 110A, 110B may be programmed to sniff the data in a forward and/or return direction, and to determine whether the uplink and/or downlink data matches the stored signature. As discussed with reference to Table 1, the signature attributes may include data pattern of the rogue data. In one example, it is assumed that data pattern of rogue data sent from a device (forward direction) and data received in response (return direction) have a same pattern. In other words, the gateway 115A, 115B computer 170 and/or a terminal 110A, 110B may be programmed to detect the rogue data in forward and/or backward direction based on the data pattern included in the stored signature. In another example, the gateway 115A, 115B computer 170 and/or a terminal 110A, 110B may be programmed to store a forward and an expected return data pattern for the sniffed rogue data. For example, the gateway 115A, 115B computer 170 and/or a terminal 110A, 110B may be programmed to determine a data pattern of rogue data in the return direction based on the detected pattern of the rogue data in the forward direction.

As an example of complete dropping of data packets, if the computer 160, 170 determines that the attack is a flooding attack of one or more of types ICMP, UDP, or TCP SYN, with a frequency of attack of 100%, then the computer 160, 170 may be programmed to completely drop the data packets of the rogue data, e.g., by adding the source of data, e.g., the rogue device 120A identifier into firewall list.

As an example of throttling the data rate, the computer 160, 170 may be programmed to block rogue data by throttling a data rate (i.e., reducing a rate of data passing thought the respective terminal and/or gateway) when rogue data is mixed with normal traffic (i.e., authorized data). The computer 160, 170 may be programmed to reduce the data rate based on the determined frequency of attack F. For example, the computer 160, 170 may be programmed to throttle the data rate or bandwidth to 100%-F. For example, if an UDP flooding signature has a frequency of attack of 90%, then the computer 160, 170 may be programmed to throttle the bandwidth down to 10%.

As an example of throttling the bandwidth, the computer 160, 170 may be programmed to throttle the bandwidth, if a rogue signature has a type of attack of TCP SYN and a frequency of attack F of less than 100%. The computer 160, 170 may be programmed to throttle the bandwidth to 100%-F, e.g., 10% of bandwidth will be provided when the frequency of attack is 90%.

Processing

Figure 2:
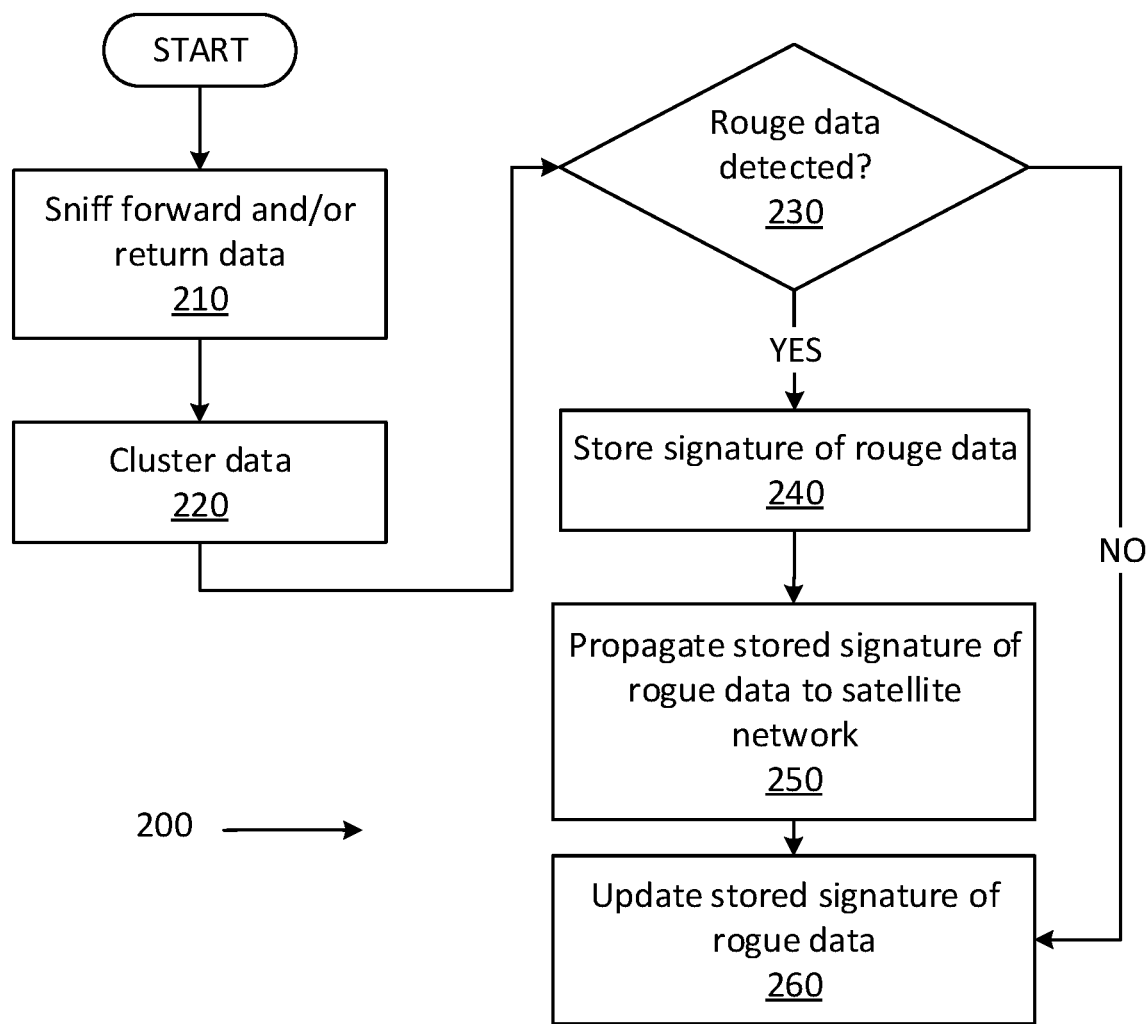
FIG. 2 is a flowchart of an example process for a terminal of the satellite network of FIG. 1.
Figure 2:
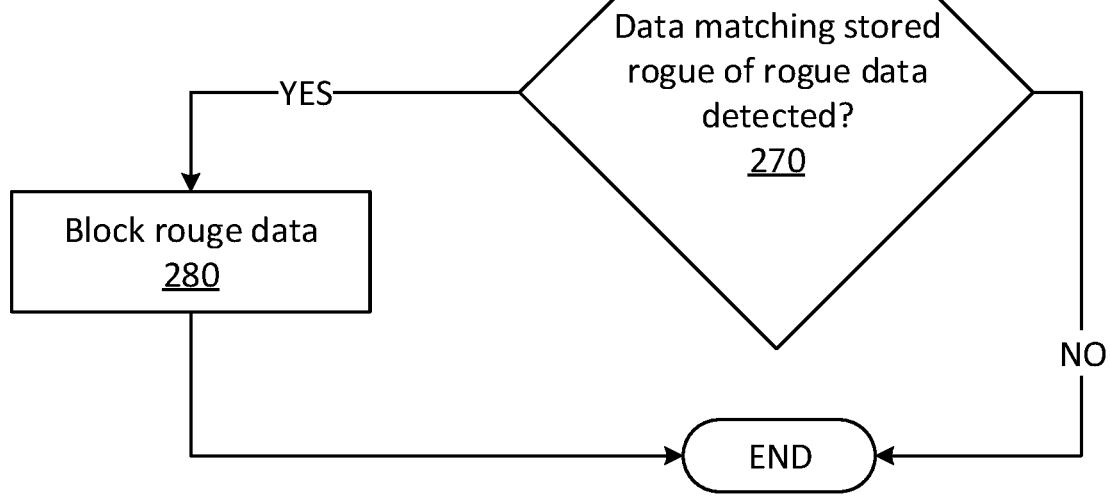

FIG. 2 is a flowchart of an example process 200 for a terminal 110A, 110B of the satellite network 100 of FIG. 1. For example, a terminal 110A, 110B may be programmed to execute blocks of the process 200.

The process 200 begins in a block 210, in which the terminal 110A, 110B sniffs and/or return data traffic of the device 120A. A 110A, 110B computer 160 may be programmed to sniff the data that is communicated through the device 120A in a forward and/or return direction.

Next, in a block 220, the computer 160 clusters the data traffic from the device 120A.

Next, in a decision block 230, the computer 160 determines whether rogue data is detected. The computer 160 may be programmed to determine that rogue data is detected upon detecting a type of attack that is included in a list of attack types stored in the memory 130, e.g., as described above. If the computer 160 determines that rogue data is detected, then the process 200 proceeds to a block 240; otherwise the process 200 proceeds to a block 260.

In the block 240, the computer 160 stored a signature of the detected rogue data. The computer 160 may be programmed to identify an identifier of a device 120A that sends and/or receives the detected rogue data, an identifier of the software application that sends and/or receives the rogue data, a frequency of attack, etc., and to store the signature including the identifier of device 120A, identifier of the rogue application, data pattern type of attack, and/or frequency of attack in the memory 130.

Next, in a block 250, the computer 160 broadcasts the stored signature data in the network 100. The computer 160 may be programmed to broadcast the stored signatures by transmitting message(s) including the signature data to other terminals 110A, 110B, gateways 115A, 115B, and/or other computers in the network 100. Following the block 250, the process 200 proceeds to the block 260.

In the block 260, the computer 160 updates stored signature data. The computer 160 may be programmed to verify whether each of the attacks associated with the stored signature data continue. If the computer 160 determines that one or more of the stored attacks do not continue, then the computer 160 may remove the one or more stored attacks from the memory 130. Additionally or alternatively, the computer 160 may be programmed to update the stored signatures based on received list of signatures broadcasted by other terminals 110A, 110B, gateways 115A, 115B in the network 100.

Next, in a decision block 270, the computer 160 determines whether data matching the stored rogue signature data is detected. The computer 160 may be programmed to cluster the data traffic and cluster the sniffed data. The computer 160 may be programmed to determine whether the sniffed data includes rogue data based on the stored list of signatures of rogue data. If the computer 160 determines that the sniffed data includes data matching the stored signatures, then the process 200 proceeds to a block 280; otherwise the process 200 ends, or alternatively, returns to the block 210, although not shown in FIG. 2.

In the block 280, the computer 160 blocks the detected rogue data. The computer 160 may be programmed to block the detected rogue data by dropping data packets or throttling data bandwidth and/or connection bandwidth.

Following the block 280, the process 200 ends, or alternatively, returns to the block 210, although not shown in FIG. 2.

Figure 3:
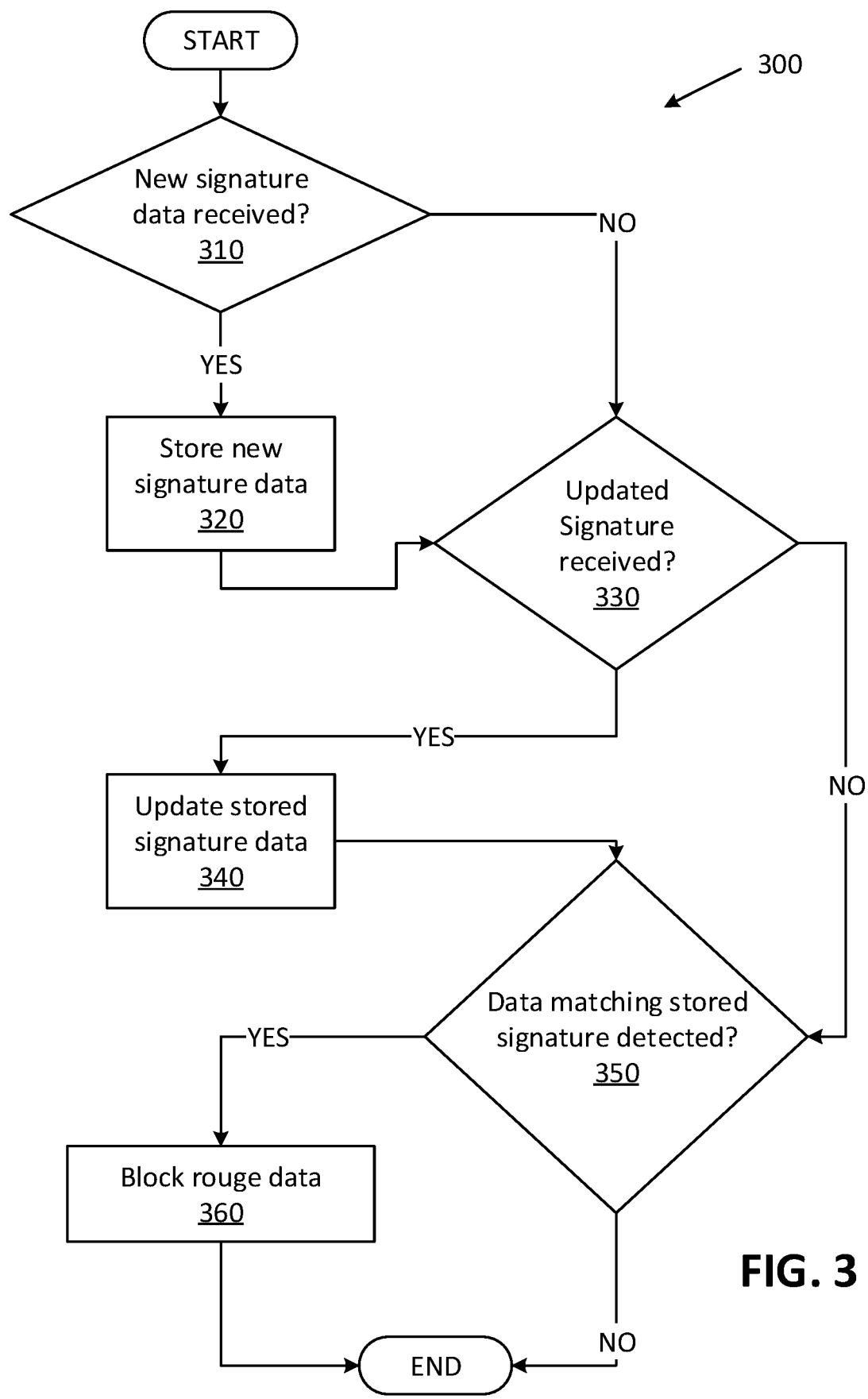
FIG. 3 is a flowchart of an example process for a gateway of the satellite network.

FIG. 3 is a flowchart of an example process 300 for a gateway 115A, 115B of the satellite network 100. For example, a gateway 115A, 115B and/or any other computer in the network 100 and/or the botnet network 150 may be programmed to execute blocks of the process 300.

The process 300 begins in a decision block 310, in which the gateways 115A computer 170 determines whether new signature data was received. The computer 170 may be programmed to receive a list of signature(s) from a device 120A, 120B, 120C, 120D, a second gateway 115B, and/or any other computer in the network 100. If the computer 170 determines that one or more signature(s) were received, then the process 300 proceeds to a block 320; otherwise the process 300 proceeds to a decision block 330.

In the block 320, the computer 170 stores the new signature in the gateway 115A memory 140.

In the decision block 330, the computer 170 determines whether updated signature data was received. The computer 170 may be programmed to receive updated signature data including at least one of (i) a change of signature data, e.g., change of frequency of attack, and (ii) an elimination of the signature. If the computer 170 determines that updated signature data was received, then the process 300 proceeds to a block 340; otherwise the process 300 proceeds to a decision block 350.

In the block 340, the computer 170 updates the stored signature data. The computer 170 may be programmed to update the signature data stored in the memory 140 based on the received signature data. The computer 170 may be programmed to eliminate a stored signature upon determining that the status of the signature data has changed to "expired." The computer 170 may be programmed to modify a stored signature based on received signature data, e.g., updating a frequency of attack. Following the block 340, the process 300 proceeds to a decision block 350.

In the block 350, the computer 170 determines whether rogue data matching one or more stored signatures was detected. The computer 170 may be programmed to detect rogue data by sniffing data that is communicated via the gateway 115A, clustering the sniffed data, and detecting rogue data based on stored signatures and clustering of the sniffed data. If the computer 170 determines that rogue data was detected, then the process 300 proceeds to a block 360; otherwise the process 300 ends, or alternatively, returns to the decision block 310, although not shown in FIG. 3.

In the block 360, the computer 170 block the detected rogue data. The computer 170 may be programmed to block the detected rogue data by dropping data packets or throttling data bandwidth and/or connection bandwidth. In one example, the computer 170 may be programmed to block any data received from the rogue device based on the device identifier. In another example, the computer 170 may be programmed to block the data from the application that generates the rogue data (e.g., based on the application identifier included in the data), whereas allowing rest of data from the device (i.e., data from other application on the rogue device) to pass through.

Following the block 360, the process 300 ends, or alternatively, returns to the decision block 310, although not shown in FIG. 3.

Additionally or alternatively, with respect to FIGS. 4-5, identifying a rogue data signature based on clustering and blocking rogue communication based on stored signatures may be performed as described with respect to the processes 400, 500 discussed below with reference to FIGS. 4 and 5, respectively.

Figure 4:
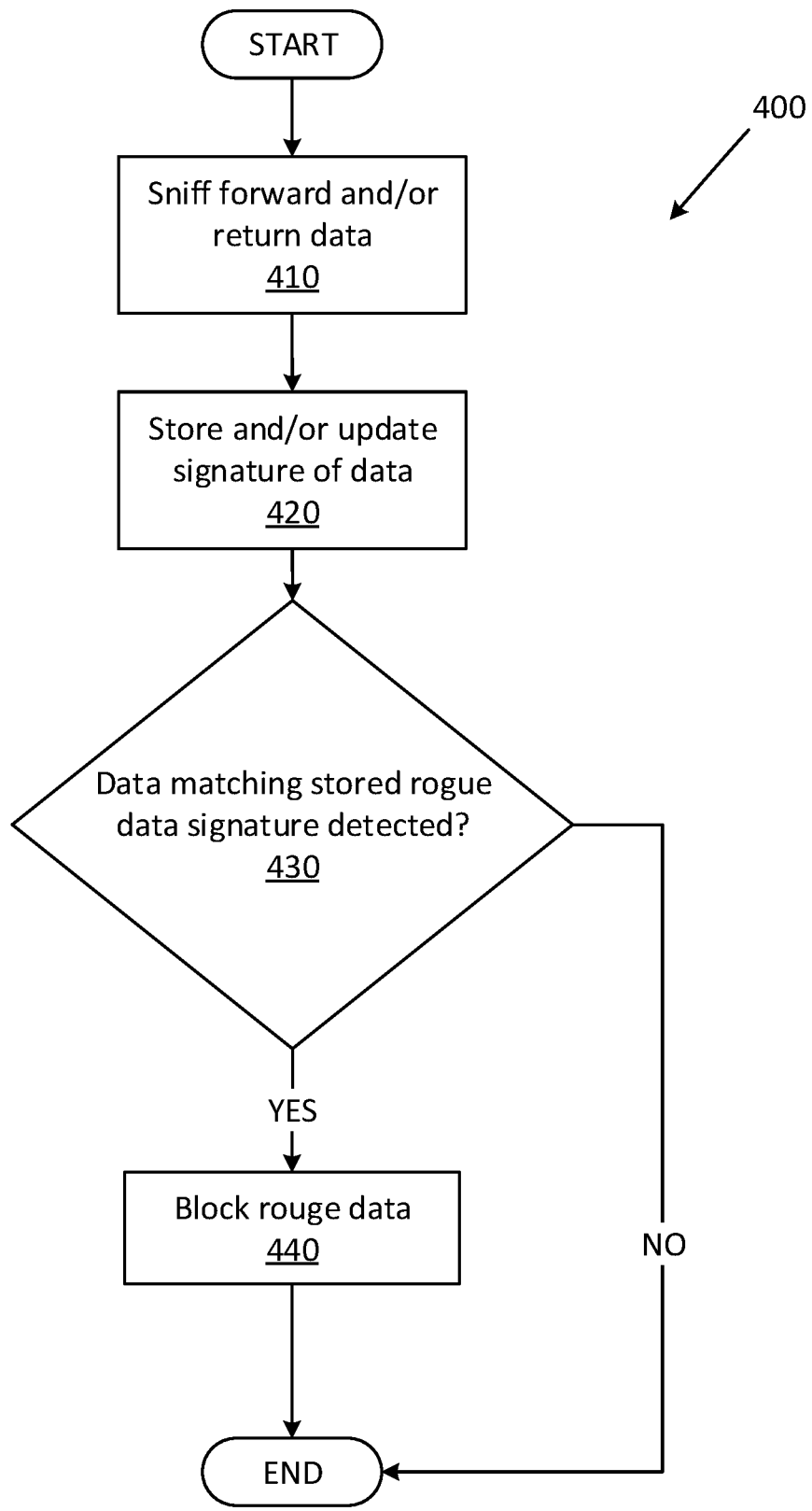
FIG. 4 is a flowchart if an example process for blocking rogue data communication.

FIG. 4 is a flowchart of an example process 400 for sniffing data and blocking rogue data communication. In one example, a computer 160, 170 may be programmed to execute blocks of the process 400.

The process 400 begins in a block 410, in which the computer 160, 170, sniffs forward and/or return data.

Next, in a block 420, the computer 160, 170 stores and/or updates signatures of the sniffed data. The computer 160, 170 may be programmed to determine the data pattern, device identifier, application identifier, route of data, etc., and store the signature data in a memory 130, 140. The computer 160, 170 may be programmed to update a change in stored signature of data. For example, upon determining a change of data pattern communicated by a specific device (identified based on the respective device identifier) changed, the computer 160, 170 may be programmed to update the stored data pattern in the signature including the respective device identifier.

Next, in a decision block 430, the computer 160, 170 may be programmed to determine whether data matching a stored rogue data signature is detected. The computer 160, 170 may be programmed to determine the rogue data based on stored signature of data being communicated by the computer 160, 170 (forward and/or return direction) and the stored signatures of the rogue data. If the computer 160, 170 determine that data matching stored signature of rogue data is detected, then the process 400 proceeds to a block 440; otherwise the process 400 ends, or alternatively returns to the block 410, although not shown in FIG. 4.

In the block 440, the computer 160, 170 blocks the rogue data. As one example, the computer 160, 170 may be programmed to block the detected rogue data by dropping data packets or throttling data bandwidth and/or connection bandwidth.

Following the block 440, the process 400 ends, or alternatively returns to the block 410, although not shown in FIG. 4.

Figure 5:
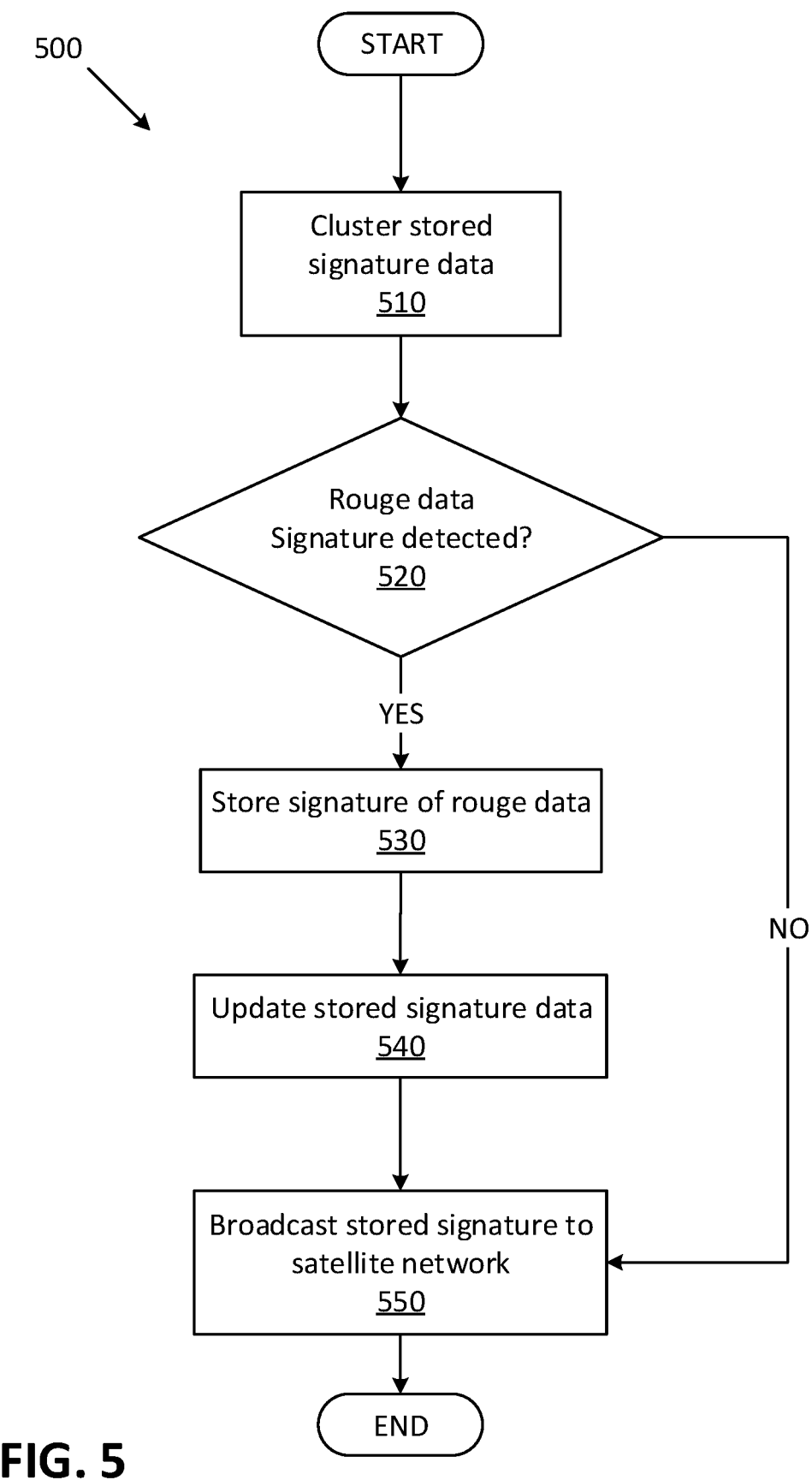
FIG. 5 is a flowchart of an example process for clustering data and storing signature data of rogue data.

FIG. 5 is a flowchart of an example process 500 for clustering data and storing signatures of rogue data. A computer 160, 170 may be programmed to execute blocks of the process 500. In one example, blocks of the processes 400, 500 are executed in a same computer 160, 170. For example, the processes 400, 500 may be performed concurrently on a same processor or on different processors of the same computer 160, 170. In yet another example, a first computer 160, 170 may be programmed to execute blocks of the process 400 or the process 500. And yet further possibly, a second computer 160, 170 may be programmed to execute blocks of the other of the process 400 or the process 500. In other words, a computer 160, 170 may be programmed to (i) cluster and identify signature of rogue data, and/or (ii) detect rogue data and block rogue data communication.

The process 500 begins in a block 510, the computer 160, 170 clusters the stored signature data. For example, the computer 160, 170 may be programmed to cluster data signature data that are stored by the process 400 (see block 420) in a memory 130, 140.

Next, in a decision block 520, the computer 160, 170 determines whether a rogue data signature is detected. The computer 160, 170 may be programmed to detect a rogue data signature based on the clustered data. If the computer 160, 170 detects one or more rogue data signatures, the process 500 proceeds to a block 530; otherwise the process 500 proceeds to a block 550.

In the block 530, the computer 160, 170 stores the signature of the rogue data. The computer 160, 170 may be programmed to store the signatures of the detected rogue data in a memory 1340, 140. For example, the computer 160, 170 may be programmed to store the signatures of rogue data in form of, e.g., a table such as Table 3.

Next, in a block 540, the computer 160, 170 updates stored signature data. The computer 160, 170 may be programmed to update one or more signatures.

Next, in the block 550, the computer 160, 170 broadcasts the stored signature data to the satellite network 100.

Following the block 550, the process 500 ends, or alternatively returns to the decision block 510, although not shown in FIG. 5.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
a terminal, programmed to:
sniff at least one of uplink and downlink data;
identify, in sniffed data, based on clustering the sniffed data, a signature of rogue data that includes at least a device identifier and an application identifier; and
transmit, via uplink to a satellite, the identified signature to a gateway; and the gateway, programmed to:
block downlink data, upon determining that downlink data includes the received signature; and
broadcast the received signature to a second gateway.

2. The system of claim 1, further comprising a second terminal, programmed to:
receive the signature from the second gateway;
receive data from a user device; and
block uplink data associated with the received data upon determining that the received data from the user device includes the received signature.

3. The system of claim 2, wherein the second terminal is further programmed to store the received signature locally.

4. The system of claim 1, wherein the gateway is further programmed to:
sniff at least one of uplink and downlink data;
identify the signature of a rogue device;
broadcast the identified signature; and
block at least one of the downlink and uplink of the rogue data.

5. The system of claim 1, wherein the signature further includes a data pattern, a type of attack, a frequency of attack, and a status.

6. The system of claim 5, wherein the type of attack is at least one of SYN Flood, UDP Flood, SMBLoris, ICMP Flood, and HTTP Get Flood.

7. The system of claim 1, wherein the terminal is further programmed to change a status of the signature to expired upon determining that the received data lacks rogue data associated with the signature.

8. The system of claim 1, wherein the terminal is further programmed to update a previously stored signature and broadcast the updated signature.

9. A method, comprising:
sniffing, at a terminal, at least one of uplink and downlink data;
identifying, in sniffed data at the terminal, based on clustering the sniffed data, a signature of rogue data that includes at least a device identifier and an application identifier; and
transmitting, via uplink to a satellite, the identified signature to a gateway;
blocking downlink data, at the gateway, upon determining that downlink data includes the received signature; and
broadcasting the received signature to a second gateway.

10. The method of claim 9, further comprising:
receiving, at a second terminal, the signature from the second gateway;
receiving, at the second terminal, data from a user device; and
blocking uplink data associated with the received data, at the second terminal, upon determining that the received data from the user device includes the received signature.

11. The method of claim 10, further comprising storing the received signature locally at the second terminal.

12. The method of claim 9, further comprising:
sniffing, at the gateway, at least one of uplink and downlink data;
identifying, at the gateway, the signature of a rogue device;
broadcasting, at the gateway, the identified signature; and
blocking, at the gateway, at least one of the downlink and uplink of the rogue data.

13. The method of claim 9, wherein the signature further includes a data pattern, a type of attack, a frequency of attack, and a status.

14. The method of claim 13, wherein the type of attack is at least one of SYN Flood, UDP Flood, SMBLoris, ICMP Flood, and HTTP Get Flood.

15. The method of claim 9, further comprising updating, at the terminal, a previously stored signature and broadcasting the updated signature.

16. A system, comprising:
means for sniffing, at a terminal, at least one of uplink and downlink data;
means for identifying, in sniffed data at the terminal, based on clustering the sniffed data, a signature of rogue data that includes at least a device identifier and an application identifier; and
means for transmitting, via uplink to a satellite, the identified signature to a gateway;
means for blocking downlink data, at the gateway, upon determining that downlink data includes the received signature; and
means for broadcasting the received signature to a second gateway.

17. The system of claim 16, further comprising:
means for receiving, at a second terminal, the signature from the second gateway;
means for receiving, at the second terminal, data from a user device; and
means for blocking uplink data associated with the received data, at the second terminal, upon determining that the received data from the user device includes the received signature.

* * * * *